United States Patent
Frimout et al.

(10) Patent No.: US 6,850,567 B1
(45) Date of Patent: Feb. 1, 2005

(54) EMBEDDING SUPPLEMENTAL DATA IN A DIGITAL VIDEO SIGNAL

(75) Inventors: Emmanuel D. L. M. Frimout, Eindhoven (NL); Stephanus J. J. Nijssen, Eindhoven (NL); Johan P. M. G. Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 876 days.

(21) Appl. No.: 09/142,549
(22) PCT Filed: Jan. 12, 1998
(86) PCT No.: PCT/IB98/00026
§ 371 (c)(1), (2), (4) Date: Sep. 10, 1998
(87) PCT Pub. No.: WO98/31152
PCT Pub. Date: Jul. 16, 1998

(30) Foreign Application Priority Data

Jan. 13, 1997 (EP) ............................................. 97200058
Aug. 26, 1997 (EP) ............................................. 97202612

(51) Int. Cl.⁷ ................................................. H04N 7/12
(52) U.S. Cl. ................ 375/240.15; 382/232; 348/415.1
(58) Field of Search ............................... 375/240, 240.1, 375/240.13, 240.25, 240.15; 348/384.1, 394.1, 412.1, 415.1, 439.1; 382/251, 115, 203, 279, 284, 232; 713/176; 380/203, 5, 202, 204

(56) References Cited

U.S. PATENT DOCUMENTS

| | | | | |
|---|---|---|---|---|
| 5,293,229 A | * | 3/1994 | Iu | 375/240.15 |
| 5,757,910 A | * | 5/1998 | Rim | 375/240.25 |
| 5,809,139 A | * | 9/1998 | Girod et al. | 382/232 |
| 5,859,920 A | * | 1/1999 | Daly et al. | 382/284 |
| 5,889,868 A | * | 3/1999 | Moskowitz et al. | 382/251 |
| 6,131,161 A | | 10/2000 | Linnartz | 713/176 |

FOREIGN PATENT DOCUMENTS

WO    WO9713248    4/1997    ........... G11B/20/00

* cited by examiner

Primary Examiner—Gims Philippe
(74) Attorney, Agent, or Firm—Edward W. Goodman

(57) ABSTRACT

An MPEG-encoded video signal includes groups of pictures (GOPs), each GOP having an intraframe coded (I) picture and a series of predictively encoded (P) pictures and bidirectionally predictively encoded (B) pictures. Usually, the GOP structure IBBPBBP . . . is used. However, in order to embed a watermark in the MPEG-encoded video signal, the MPEG encoder is forced to produce a GOP structure which does not normally occur, e.g., a GOP including a BPP sequence. Different symbol values can be assigned to different positions of the BPP sequence in the GOP.

8 Claims, 3 Drawing Sheets

EMBEDDING SUPPLEMENTAL DATA IN A DIGITAL VIDEO SIGNAL

BACKGROUND OF THE INVENTION

1. Field of the Invention

The invention relates to a method and arrangement for embedding supplemental data in a digital video signal. The invention also relates to an arrangement for decoding the embedded supplemental data.

2. Description of the Related Art

Video and audio signals are increasingly transmitted and recorded in a digitally encoded form, for example, an MPEG bit stream. There is a growing need to accommodate supplemental data in the signal, for example, a watermark to classify the signal as authentic program material. Watermarking digital signals is particularly useful in copy protection applications. The watermark can effectively take the form of a single bit indicating that the signal constitutes copy protected material, or a multi-bit code representing the originator of the material.

In the known MPEG standard for audio and video compression, a copy protection bit has been defined for that purpose. However, a disadvantage of this known method is that the protection bit can easily be modified to circumvent the copyright protection mechanism.

SUMMARY OF THE INVENTION

It is an object of the invention to provide a method and arrangement for embedding a watermark in a video signal in such a manner that the embedded watermark can easily be detected but is difficult to remove.

To this end, the invention provides a method of embedding supplemental data in a video signal comprising the step of encoding the video signal in groups of pictures comprising an intraframe (I) coded picture and a series of predictively (P) and bidirectionally predictively (B) coded pictures, characterized by encoding the video signal in such a manner that the pattern of picture coding types in a group of pictures (GOP) represents a supplemental data value.

With the invention, it is achieved that a watermark can easily be detected. The picture coding types are accommodated in the picture headers of an MPEG bit stream and can easily be read. However, changing the picture coding type in a picture header to remove the watermark renders the picture data no longer compliant with the coding standard. The MPEG bit stream can no longer be decoded by a compliant decoder. The relevant picture must be transcoded to comply with the new picture coding type, e.g., by decoding the picture and encoding it again.

It should be noted that the general idea of generating a predetermined sequence of I, P and B pictures in an MPEG signal so as to mark a digital video signal has also been proposed in Applicant's International Patent Application WO 97/13248, corresponding to U.S. Pat. No. 6,131,161. However, this application was published after the priority date of the present invention and fails to disclose the representation of a supplemental data value by a pattern of picture coding types within a group of pictures.

Preferably, the supplemental data value is represented by a given pattern of B and P picture coding types in a GOP, for example, by the position of a BPP pattern in a GOP. Herewith it is achieved that changing a picture coding type also changes its reference to other pictures within the GOP and, consequently, ripples through the remainder of the GOP. To remove a watermark, a substantial number of pictures in the GOP must now be transcoded rather than a single picture. There is one exception: a P picture can be transcoded into an I picture without requiring other pictures to be transcoded as well. However, the I picture must then be encoded with the low amount of bits used for the P picture. This affects the quality of the I picture as well as any P picture referring to this I picture. Consequently, a watermark cannot be removed from a GOP without either transcoding the remainder of the GOP or suffering severe decrease in quality for the remainder of the GOP.

DESCRIPTION OF THE PREFERRED EMBODIMENTS

First, the basic principles of MPEG which are essential to the watermarking method in accordance with the invention will be briefly described.

To achieve efficient video compression, an MPEG encoder encodes pictures in accordance with one of three different coding methods. Some pictures are autonomously encoded, i.e., without any reference to another picture in the video sequence. These pictures are denoted intraframe coded pictures or I pictures. Other pictures are predictively encoded, using a motion-compensated previous picture as a reference (prediction) image. They are denoted P pictures. The previous picture to which a P picture refers may be an I picture or another P picture. Yet other pictures are bidirectionally predictively encoded. They refer to a previous as well as a future I or P picture and are denoted B pictures.

Generally, the amount of bits required to represent a picture is most for I pictures, less for P pictures and least for B pictures. The amount of compression and the quality of the decoded video sequence largely depends on the performance of the motion estimation process in the encoder. Motion estimation is the most complicated and computational intensive operation of an MPEG encoder. It is this operation which will make professional MPEG encoders far superior over cost-effective consumer encoders for a long time.

In order to inform an MPEG decoder whether a received picture is an I, P or B picture, a parameter picture_type in each picture header of an MPEG video bit stream describes how the relevant picture has been encoded. If the picture coding type is I, the decoder reconstructs the picture completely from the received picture data. If the picture coding type is P, the decoder reconstructs the picture from the received picture data and an already displayed I or P picture. If the picture coding type is B, it is reconstructed on the basis of a preceding as well as a succeeding I or P picture. It should be noted that the parameter picture_type implicitly specifies the reference picture(s): a P picture refers to the most recent I or P picture, a B picture refers to the most recent and the next I or P picture.

A series of an I picture and consecutive B and P pictures are called a Group of Pictures (GOP). According to the MPEG standard, an encoder is free to choose the optimum sequence of I, B and P picture coding types. However, only a few GOP-structures are used in practice:

IPPP . . . is used by cheap encoders that do not have access to large amounts of memory.

IBPBP . . . is used by more advanced encoders.

IBBPBBP . . . is commonly used by professional encoders.

MPEG encoders currently under development optimize the GOP structure a little further than the conventional sequences listed above, usually in that an I picture is chosen when a hard scene change occurs.

Figure 1:
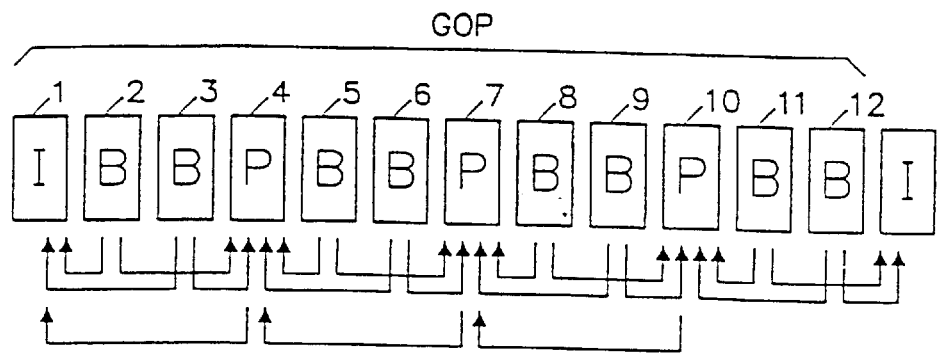
FIGS. 1–4 show examples of GOP structures of an MPEG-encoded video signal to illustrate the method of embedding supplemental data in accordance with the invention.

FIG. 1 shows an example of the commonly used IBBPBBP . . . structure of a GOP comprising 12 pictures 1, 2, . . . 12. The arrows shown in the Figure point to the relevant reference picture(s). For example, B pictures 2 and 3 have been encoded using I picture 1 and P picture 4 as prediction. B pictures 5 and 6 have been encoded using P picture 4 and P picture 7 as reference, etc. Similarly, P picture 4 has been encoded using I picture 1 as prediction. P picture 7 has been encoded using the P picture 4 as prediction, etc.; Note that the pictures are shown in display order. The transmission order is different because for decoding a B picture, the decoder must already have a future P or I picture at its disposal.

Figure 2:
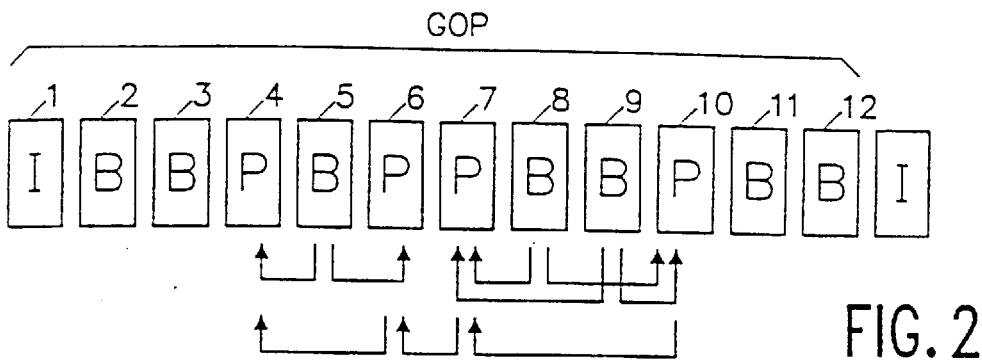

As FIG. 1 shows, the commonly used GOP structure comprises a plurality of BBP patterns. The pattern BPP is rarely used in a GOP. In a preferred embodiment of the present invention, it is this pattern which is used to represent watermark data. FIG. 2 shows a GOP including such a BPP pattern (the pictures 5, 6 and 7).

Figure 3:
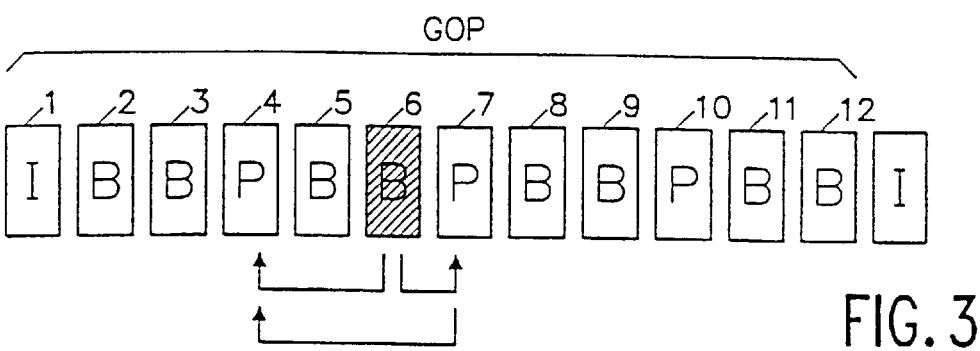

A watermark in the form of a BPP pattern can easily be detected because the picture coding type is included in the respective picture header. However, it is impossible to remove the watermark by merely changing the parameter picture_type. For example, if the parameter picture_type of picture 6 in FIG. 2 is changed from P into B as shown in FIG. 3, a decoder will decode this picture with reference to P picture 4 and P picture 7, whereas the encoder used P picture 4 as the prediction image only. Picture 7 will neither be correctly decoded because it now refers to P picture 4 whereas the encoder referred to picture 6. Needless to say that the decoder will fail, or at least produce erroneous results.

Figure 4:
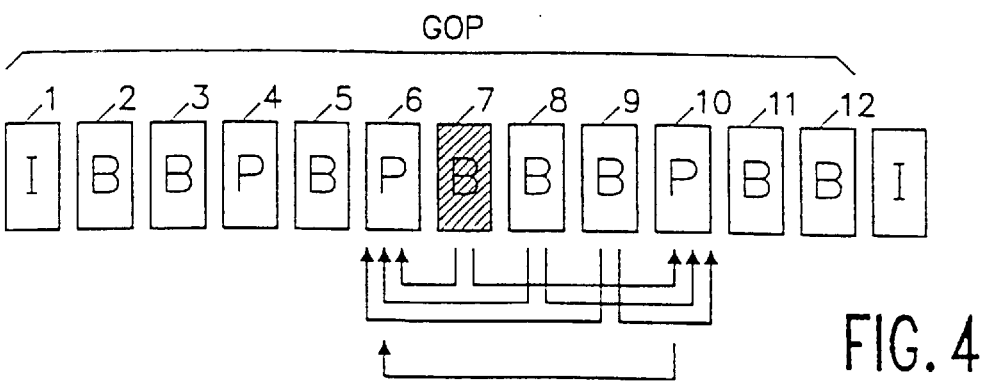

Similarly, if the watermark is removed by changing the parameter picture_type of picture 7 in FIG. 2 from P into B as shown in FIG. 4, the decoder will decode picture 7 with reference to P pictures 6 and 10, whereas the encoder made reference to picture 6 only. The pictures 8, 9 and 10 will neither be decoded correctly because their original references to P picture 7 have been changed into references to P picture 6.

Neither can the parameter picture_type of P picture 6 or P picture 7 be changed from P into I because, in that case, a predictively encoded picture is then interpreted as an autonomously encoded picture (pixel differences are interpreted as pixels).

Accordingly, in order to remove a watermark, the relevant picture has to be transcoded, i.e., decoded into the pixel domain and encoded again in accordance with its modified picture coding type. That is not attractive, for a hacker because, as mentioned before, high-quality encoding involves complicated motion estimation circuitry, unless a severe degradation of quality is accepted. In this respect, it is to be noted that not only the picture whose picture_type parameter has been changed has to be reencoded. Pictures referring to the modified picture are to be reencoded as well. For example, if picture 7 in FIG. 2 is transcoded from a P picture into a B picture as shown in FIG. 4, the B pictures 8, 9 and the P picture 10 will also have to be transcoded because their references have changed. Thus, the effect of transcoding ripples through the remainder of the GOP, unless the relevant P picture is transcoded into an I picture. However, in that case, the I picture must be compressed into the same (relatively low) number of bits as originally spent to the P picture.

The occurrence of two consecutive P pictures rarely occurs by accident. The number of false alarms (watermark detected in a non-watermarked signal) is thus limited. To further reduce the false alarm possibility, a requirement can be imposed on the maximal amount of GOPs between two watermarked GOPs. For example, a video stream is specified to be copyright protected if watermarked GOPs occur in small enough intervals.

Figure 5:
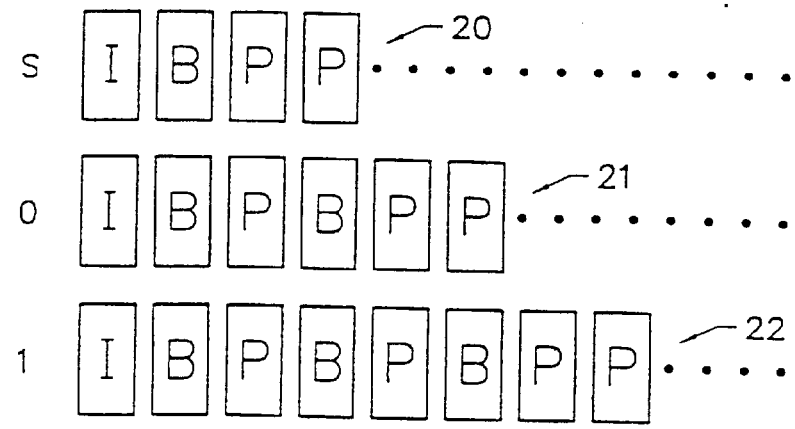
FIG. 5 shows an example of assigning different supplemental data values to respective positions of a BPP pattern in a GOP.
Figure 5:
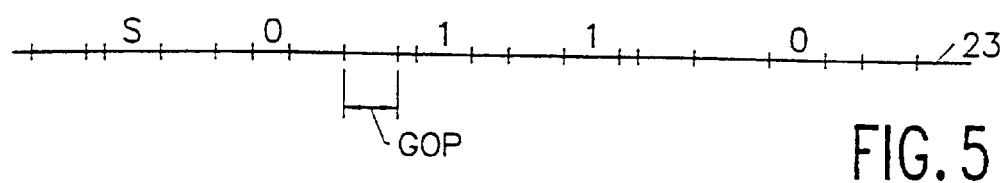

The above described concept of watermarking a GOP allows messages of any length to be embedded in an MPEG video signal. To this end, different supplemental data values are assigned to different positions of the BPP pattern in the GOP. A first example thereof is shown in FIG. 5. In this example, a GOP 20 which starts with the BPP pattern represents a sync code to indicate the start of a message. A GOP 21 with the BPP pattern after a single P represents a binary supplemental data value "0". A GOP 22 with the BPP pattern after two Ps represents a binary "1". The reference numeral 23 denotes an MPEG-encoded video signal segment with an embedded message "0110 . . . ". Note that not each GOP conveys a supplemental data value (most of the GOPs have the common IBBPBBP . . . structure) in view of the fact that watermarking affects the encoding efficiency. It is notably advantageous to embed a supplemental data value in every $n^{th}$ GOP (n being a predetermined integer) to assist a watermark detector in identifying the relevant GOPs and to reduce the false alarm rate. Note also that the GOPs in video signal 23 have variable lengths. Not only may the number of pictures in a GOP vary, the number of bits per picture also depends largely on the image contents.

It will be appreciated that the alphabet of supplemental data values can be further enlarged. For example, six different message symbols 0–5 may be assigned to GOP structures in accordance with the following Table I:

TABLE I

| symbol | GOP structure |
| --- | --- |
| 0 | IBPPBBPBB . . . |
| 1 | IBBPPBPBB . . . |
| 2 | IBBPBPPBB . . . |
| 3 | IBBPBBPPB . . . |
| 4 | IBBPBBPBPPBB . . . |
| 5 | IBBPBBPBBPPB . . . |

Figure 6:
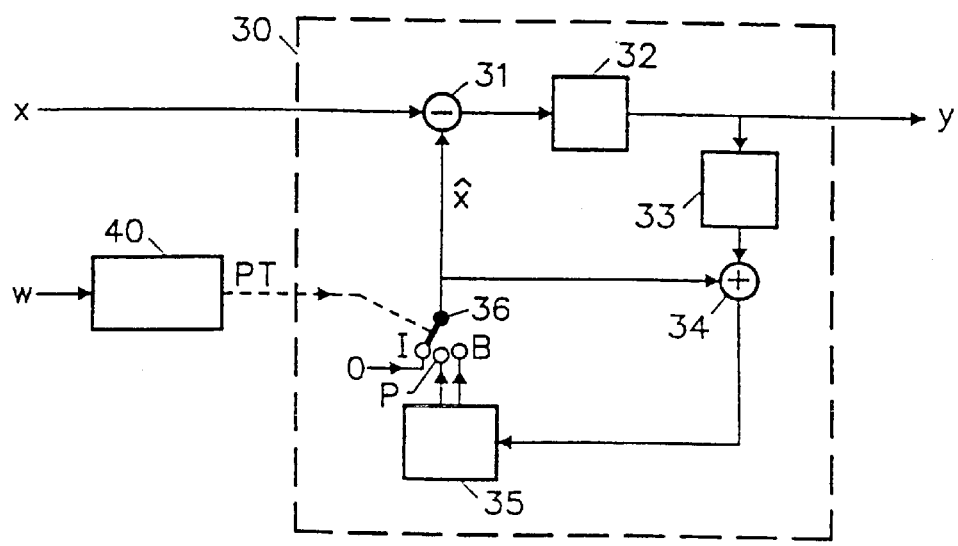
FIG. 6 shows a schematic diagram of an arrangement for embedding supplemental data in an MPEG video signal in accordance with the invention.

FIG. 6 shows a schematic diagram of an arrangement for embedding supplemental data in an MPEG video signal in accordance with the invention. The arrangement includes a conventional MPEG video encoder 30 and a control circuit 40. The MPEG video encoder 30 is shown in more details, however only to an extent necessary to understand the invention. More particularly, the encoder comprises a subtractor 31 which receives a video signal x to be encoded, and subtracts therefrom a prediction signal x̂. The difference signal is subjected to discrete cosine transform, quantization and variable length coding (in the Figure collectively denoted 32). The MPEG-encoded output signal y is transmitted to a receiver or stored on a storage medium (not shown). It is also locally decoded by a local decoder 33 and, through an adder 34, applied to a motion estimation and compensation circuit 35. Said motion estimation and compensation circuit provides a forward predicted picture and a bidirectional predicted picture.

The three MPEG encoding modes (I, P, B) are symbolized in FIG. 6 by a selection switch 36 which selects the prediction signal $\hat{x}$ applied to the subtractor 31. The selection switch has three input terminals denoted I, P and B. If the I-terminal is selected, the prediction signal $\hat{x}$ is zero which results in that the input signal x will autonomously be encoded. If the P-terminal is selected, the forward predicted picture is applied to the subtractor. If the B-terminal is selected, the bidirectional predicted picture is applied to the subtractor. The selected prediction signal $\hat{x}$ is also fed back into the motion estimation and compensation circuit 35 through the adder 34.

Figure 7:
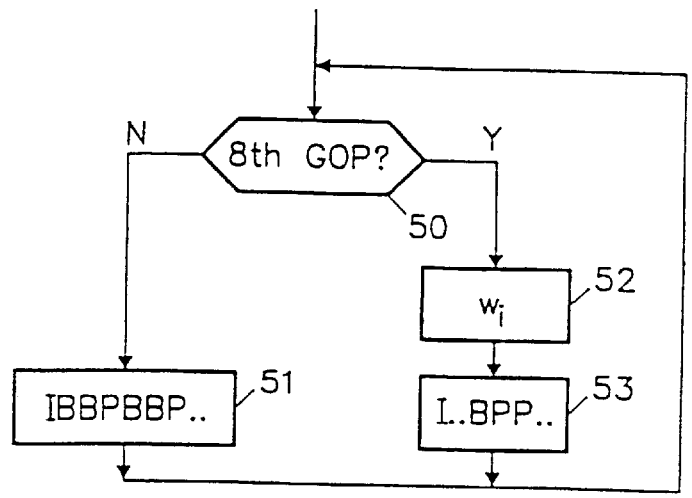
FIG. 7 shows a flowchart illustrating the operation of a control circuit which is shown in FIG. 6.

The current encoding mode (I, P, B) is controlled by the control circuit 40 which controls the selection switch 36 through a picture coding type signal PT in accordance with a received watermark message w to be embedded. FIG. 7 shows a flowchart illustrating the operation of said control circuit. In this example, it is assumed that a watermark symbol $w_i$($w_i$=0 . . . 5) is to be embedded in every $8^{th}$ GOP in accordance with Table I described hereinabove. In a step 50, it is determined whether the current GOP is the $8^{th}$ GOP. If that is not the case, the control signal PT=IBBPBBP . . . is generated in a step 51. In response thereto, the MPEG encoder produces the conventional GOP structure. However, for every $8^{th}$ GOP, the next watermark symbol $w_i$ of the watermark message w to be embedded is read in a step 52. Then, the GOP structure assigned to said symbol is looked-up in a memory in which Table I is stored, and the corresponding control signal PT=I . . . BPP . . . is generated in a step 53.

Figure 8:
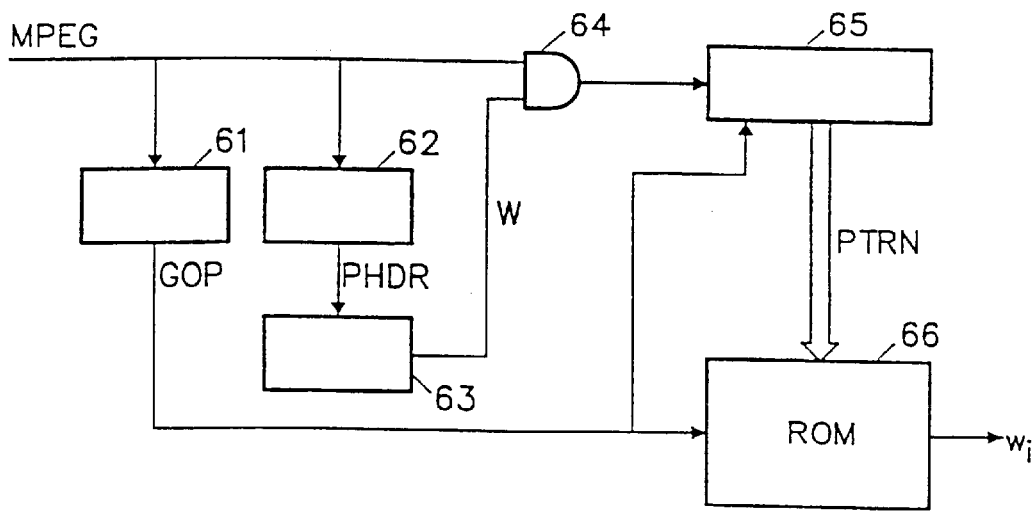
FIG. 8 shows a schematic diagram of an arrangement for decoding supplemental data embedded in an MPEG-encoded the video signal in accordance with the invention.

FIG. 8 shows a schematic diagram of an arrangement for decoding supplemental data embedded in an MPEG-encoded the video signal in accordance with the invention. The arrangement comprises a GOP detector 61, a picture header detector 62, a window generator 63, a gate 64, a shift register 65 and a look-up-table 66. The picture header detector 62 detects the presence of a predetermined 32-bits picture_start_code (the hexadecimal value 00000100) in the MPEG signal and applies a picture header signal PHDR to the window generator 63. In response thereto, the window generator 63 generates a timing window W. The window W opens the gate 64 each time an MPEG parameter picture_coding_type is received and causes said parameter to be written into the shift register 65. The parameter indicates whether the current picture is intraframe coded (I), predictively coded (P) or bidirectionally predictively coded (B). The GOP detector 61 detects the presence of a further predetermined 32-bits group_start_code (the hexadecimal value 000001B8) in the MPEG signal which indicates the start of a group of pictures. In response thereto, the detector activates the look-up-table 66 to convert the current pattern of picture coding types PTRN in shift register 65 into a supplemental data value $w_i$. In addition, the GOP detector resets the shift register 65 so as to start collecting the pattern of picture coding types for the next GOP.

In summary, a method of embedding a watermark in an MPEG-encoded video signal is disclosed. An MPEG encoded video signal includes groups of pictures (GOPs), each GOP comprising an intraframe coded (I) picture and a series of predictively encoded (P) pictures and bidirectionally predictively (B) pictures. Usually, the GOP structure IBBPBBP . . . is used. In accordance with the invention, the video signal is watermarked by forcing the MPEG encoder to produce a GOP structure which does normally not occur. e.g., a GOP including a BPP sequence. Different symbol values can be assigned to different positions of the BPP sequence in the GOP.

What is claimed is:

1. A method of embedding supplemental data in a video signal comprising the step:

encoding the video signal in groups of pictures comprising an intraframe (I) coded picture and a series of predictively (P) and bidirectionally predictively (B) coded pictures, characterized in that said method further comprises the step:

further encoding the video signal in such a manner that the pattern of picture coding types (I, P, B) in a group of pictures represents a supplemental data value.

2. The method as claimed in claim 1, wherein the supplemental data value is represented by the position of a BPP pattern in a group of pictures.

3. An arrangement for embedding supplemental data in a video signal comprising:

means for encoding the video signal in groups of pictures comprising an intraframe (I) coded picture and a series of predictively (P) and bidirectionally predictively (B) coded pictures, characterized in that said arrangement further comprises:

means for further encoding the video signal in such a manner that the pattern of picture coding types (I, P, B) in a group of pictures represents a supplemental data value.

4. The arrangement as claimed in claim 3, wherein the supplemental data value is represented by the position of a BPP pattern in a group of pictures.

5. A method of decoding supplemental data embedded in a video signal encoded in groups of pictures comprising an intraframe (I) coded picture and a series of predictively (P) and bidirectionally predictively (B) coded pictures, characterized in that said method comprises the steps:

reading the picture coding types (I, P, B) in a group of pictures; and determining a supplemental data value represented by the pattern of picture coding types in said group of pictures.

6. The method as claimed in claim 5, wherein the supplemental data value is represented by the position of a BPP pattern in the group of pictures.

7. An arrangement for decoding supplemental data embedded in a video signal encoded in groups of pictures comprising an intraframe (I) coded picture and a series of predictively (P) and bidirectionally predictively (B) coded pictures, characterized in that said arrangement comprises:

means for reading the picture coding types (I, P, B) in a group of pictures; and means for determining a supplemental data value represented by the pattern of picture coding types in said group of pictures.

8. The arrangement as claimed in claim 7, wherein the supplemental data value is represented by the position of a BPP pattern in the group of pictures.

* * * * *